(12) United States Patent
Steijer et al.

(10) Patent No.: US 9,791,647 B2
(45) Date of Patent: Oct. 17, 2017

(54) OPTOELECTRONIC MODULE WITH IMPROVED HEAT MANAGEMENT

(71) Applicant: Tyco Electronics Svenska Holdings AB, Jaerfaella (SE)

(72) Inventors: Odd Robert Steijer, Bromma (SE); Magnus Andersson, Jaerfaella (SE)

(73) Assignee: Tyco Electronics Svenska Holdings AB, Jaerfaella (SE)

( * ) Notice: Subject to any disclaimer, the term of this patent is extended or adjusted under 35 U.S.C. 154(b) by 0 days.

(21) Appl. No.: 15/203,972

(22) Filed: Jul. 7, 2016

(65) Prior Publication Data

US 2017/0023751 A1  Jan. 26, 2017

(30) Foreign Application Priority Data

Jul. 21, 2015  (EP) .................................... 15177665

(51) Int. Cl.
*G02B 6/42* (2006.01)

(52) U.S. Cl.
CPC ......... *G02B 6/4272* (2013.01); *G02B 6/4246* (2013.01); *G02B 6/4259* (2013.01); *G02B 6/4269* (2013.01); *G02B 6/4281* (2013.01); *G02B 6/4292* (2013.01); *G02B 6/4284* (2013.01)

(58) Field of Classification Search
None
See application file for complete search history.

(56) References Cited

U.S. PATENT DOCUMENTS

| 7,156,562 | B2 * | 1/2007 | Mazotti | G02B 6/4246 385/88 |
|---|---|---|---|---|
| 2004/0042740 | A1 * | 3/2004 | Ohno | G02B 6/4201 385/92 |
| 2005/0168957 | A1 * | 8/2005 | Kawauchi | G02B 6/4246 361/749 |
| 2010/0061735 | A1 * | 3/2010 | Minota | H05K 1/148 398/139 |
| 2012/0082420 | A1 * | 4/2012 | Aoki | H05K 1/0204 385/88 |
| 2012/0224814 | A1 * | 9/2012 | Hirano | H04N 7/22 385/49 |
| 2015/0003839 | A1 * | 1/2015 | Minota | H04B 10/2503 398/138 |
| 2015/0078760 | A1 * | 3/2015 | Kurashima | H04B 10/40 398/139 |
| 2015/0256261 | A1 * | 9/2015 | Ho | G02B 6/43 398/139 |
| 2015/0331208 | A1 * | 11/2015 | Moriyama | H01L 31/0232 385/14 |
| 2016/0246019 | A1 * | 8/2016 | Ishii | G02B 6/4272 |

FOREIGN PATENT DOCUMENTS

JP  2012-159539 A  *  8/2012

* cited by examiner

*Primary Examiner* — Mike Stahl
(74) *Attorney, Agent, or Firm* — Barley Snyder

(57) ABSTRACT

An optoelectronic module is disclosed. The optoelectronic module comprises an optical connector, a contact, an opto-electric assembly, and a casing. The opto-electric assembly has a carrier optically connected to the optical connector by a flexible optical fiber and electrically connected to the contact by a flexible cable. The casing at least partially encloses the opto-electric assembly, the optical connector, and the contact. An inner surface of a wall of the casing is attached to the carrier in a thermally conductive manner.

24 Claims, 5 Drawing Sheets

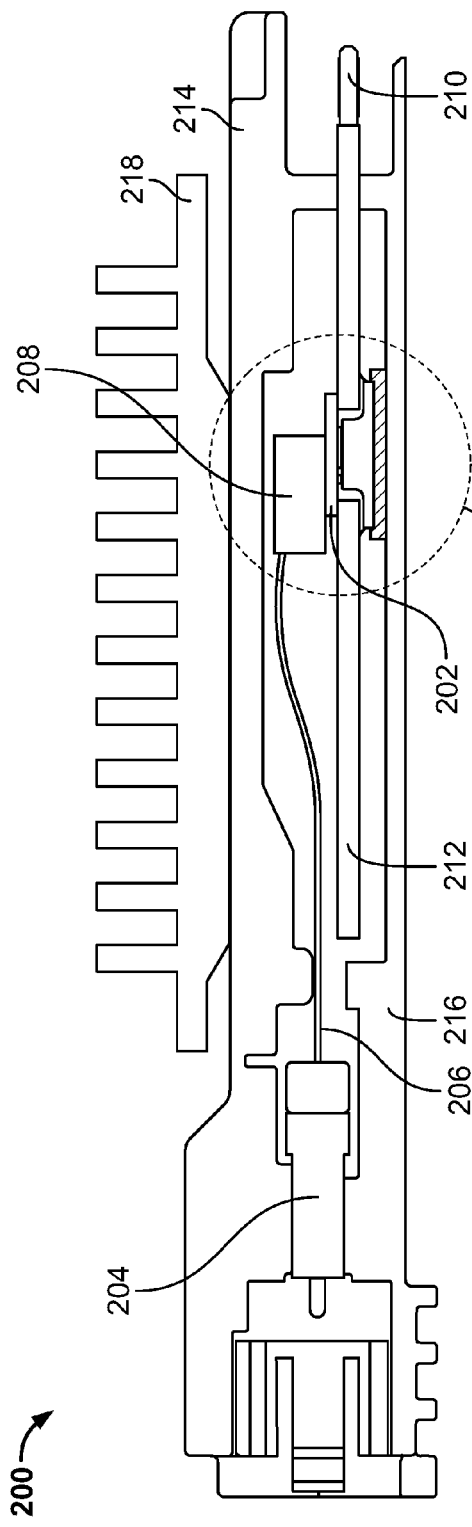
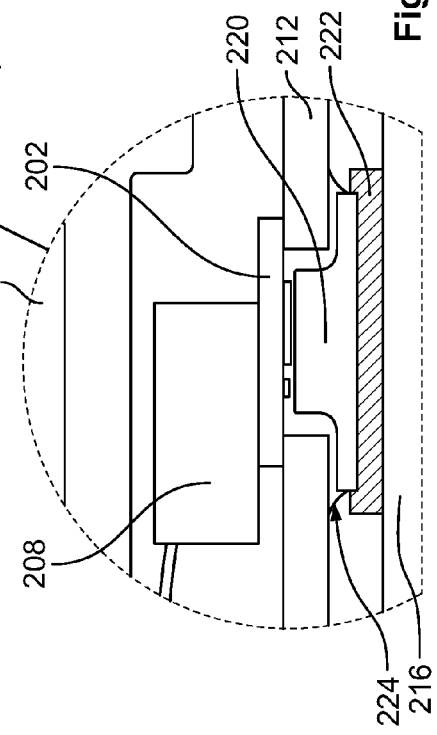
Fig 1 (PRIOR ART)
Fig 2 (PRIOR ART)

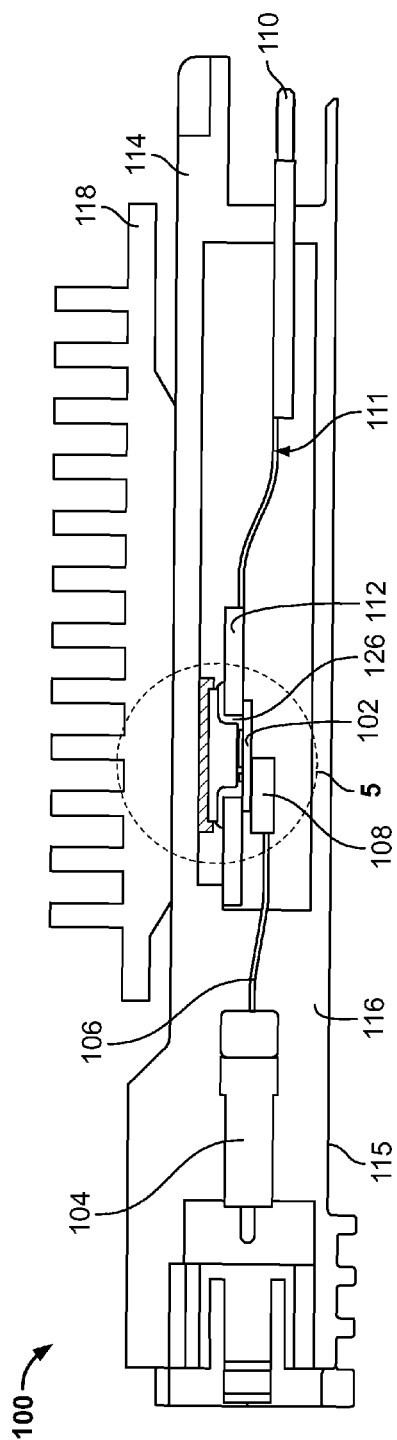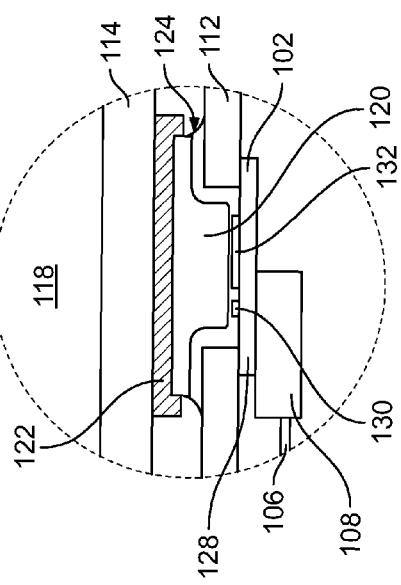

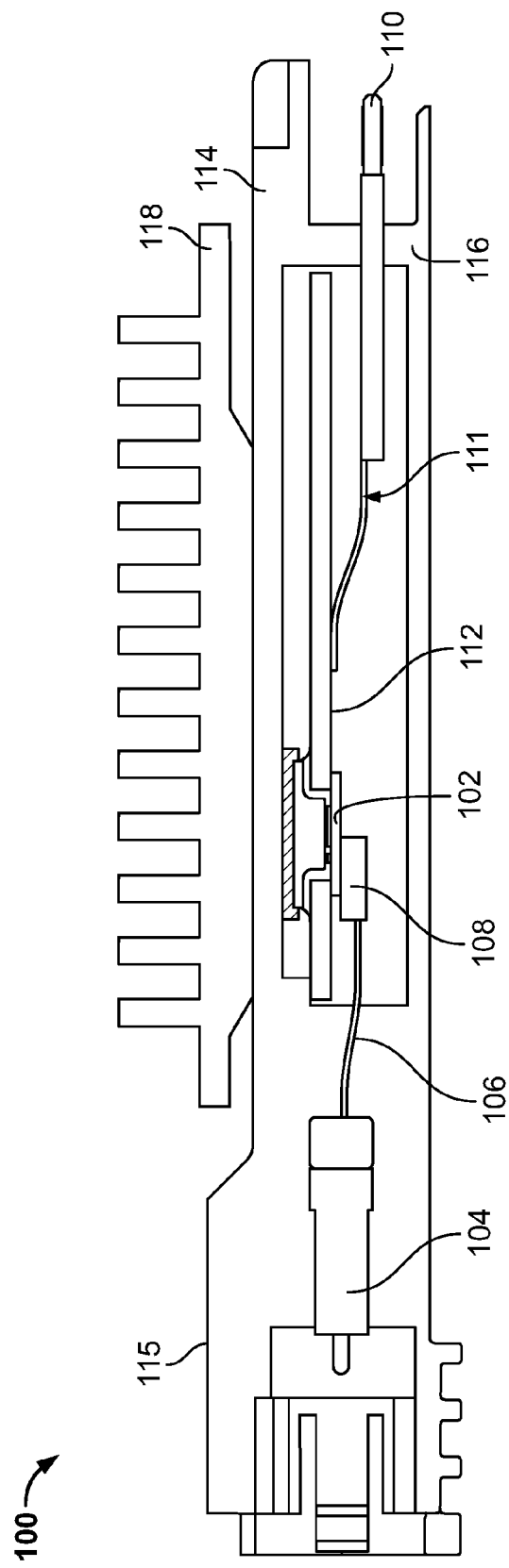

US 9,791,647 B2

OPTOELECTRONIC MODULE WITH IMPROVED HEAT MANAGEMENT

CROSS-REFERENCE TO RELATED APPLICATIONS

This application claims the benefit of the filing date under 35 U.S.C. §119(a)-(d) of European Patent Application No. 15177665.5, filed Jul. 21, 2015.

FIELD OF THE INVENTION

The present invention relates to an optoelectronic module, and more particularly, to an optoelectronic module for receiving an optical ferrule and for electrically connecting with an electrical connector.

BACKGROUND

Optoelectronic modules, such as optoelectronic transceivers, are increasingly used in electronic and optoelectronic communication. Optoelectronic modules generally include an outer housing or casing that at least partially encloses one or more transmitters and/or receivers as well as one or more printed circuit boards (PCB) with circuitry related to the transmitters/receivers, such as driving and amplifying circuitry. Electrical data signals generally pass through this circuitry as they pass between the transmitter/receiver and a host device in which the optoelectronic module is positioned.

Known optoelectronic module assemblies must make compromises between optical connections, electrical connections, mechanical connections, and thermal management due to design limitations imposed by the assembly technologies. For example, increasing the frequency of the transmitted or received data signal permits an increased rate of data communication via the optoelectronic module. However, increasing data signal frequencies may present a number of difficulties in designing optoelectronic modules, in particular, proper thermal management.

An example of a known optoelectronic module is the Quad Small Form-Factor Pluggable (QSFP) transceiver module sold by TE Connectivity under the name "QSFP28 Transceiver". A schematic longitudinal cross-section of this transceiver module 200 is shown in FIGS. 1 and 2. FIG. 3 is a block diagram of the QSFP transceiver 200.

The transceiver module comprises an optical engine (OE) 202 containing optical components such as vertical-cavity surface-emitting lasers (VCSELs) and photodiodes as well as electronic components for simultaneously transmitting and receiving signals between the optical and the electrical side. From the optical side, an optical ferrule (not shown in the Figure) can be connected to a fiber optic connector 204. The fiber optic connector 204 is for instance formed as a standardized so-called mechanical transfer (MT) connector. An internal fiber pigtail 206 connects the fiber optic connector 204 to the optical engine 202. An optical chip connector 208 contacts the optical engine 202.

For contacting the electrical side, the transceiver module 200 comprises a rigid edge connector 210 for contacting an electrical connector (not shown in the Figure). The edge connector 210 is an integral part of a printed circuit board (PCB) 212 which carries the OE 202.

The transceiver module 200 further comprises a casing formed by two walls 214, 216. The upper wall 214 is formed to be thermally contacted by an external heat sink 218. The heat sink 218 is a part of a cage assembly which is not shown in the Figure. A thermal bridge 220 forming part of a thermal interface conducts heat generated by the optical engine 202 towards the casing. A compressible thermal interface material, in particular a gap pad 222 connects the thermal bridge 220 with the lower wall 216 of the casing. A sealing and thermally conductive casting compound 224 fills the gap between the thermal bridge 220 and the heat generating components of the OE 202.

The position and shape of the electrical interface formed by the edge connector 210 is defined by the standard SFF-8661. As a consequence, there is not enough space for the optical engine 202 and the optical chip connector 208 to face the casing's lower shell 216, which means that the thermal interface must be disposed to interface to the casing's lower shell 216. Having the thermal interface (including the thermal bridge) arranged at the lower shell 216 results in a long heat dissipation path since the outer heat sink 218 is attached to the casing's top shell 214. The result is a higher working temperature, which influences VCSEL life time. Furthermore, since the PCB 212 has to be mechanically floating with respect to the casing, the thermal interface has to be compliant, which further decreases the thermal performance. A certain force has to be applied to the thermal interface to keep it intact, which applies mechanical stress to the solder electrical interface between the OE 202 and the PCB 212. Additionally, the predetermined position of the thermal interface results in high requirements on the length of the internal fiber pigtail 206; otherwise there will be too high mechanical stress on the optical connection to the OE 202.

In a known optoelectronic module design, the thermal, optical, mechanical, and electrical connections are tightly integrated, and optimization of one connection type interferes with the others, causing a non-optimal overall performance.

SUMMARY

An object of the invention, among others, is to provide an optoelectronic module with improved heat management which is robust, reliable, and can be fabricated economically. The disclosed optoelectronic module comprises an optical connector, a contact, an opto-electric assembly, and a casing. The opto-electric assembly has a carrier optically connected to the optical connector by a flexible optical fiber and electrically connected to the contact by a flexible cable. The casing at least partially encloses the opto-electric assembly, the optical connector, and the contact. An inner surface of a wall of the casing is attached to the carrier in a thermally conductive manner.

BRIEF DESCRIPTION OF THE DRAWINGS

The invention will now be described by way of example with reference to the accompanying figures, of which:

FIG. 1 is a sectional view of a known optoelectronic module;

FIG. 2 is a detailed view of a portion of the optoelectronic module shown in FIG. 1;

FIG. 4 is a sectional view of an optoelectronic module according to the invention;

FIG. 5 is a detailed view of a portion of the optoelectronic module shown in FIG. 4;

FIG. 8 is a sectional view of an optoelectronic module according to according to another embodiment of the invention.

DETAILED DESCRIPTION OF THE EMBODIMENT(S)

Figure 3:
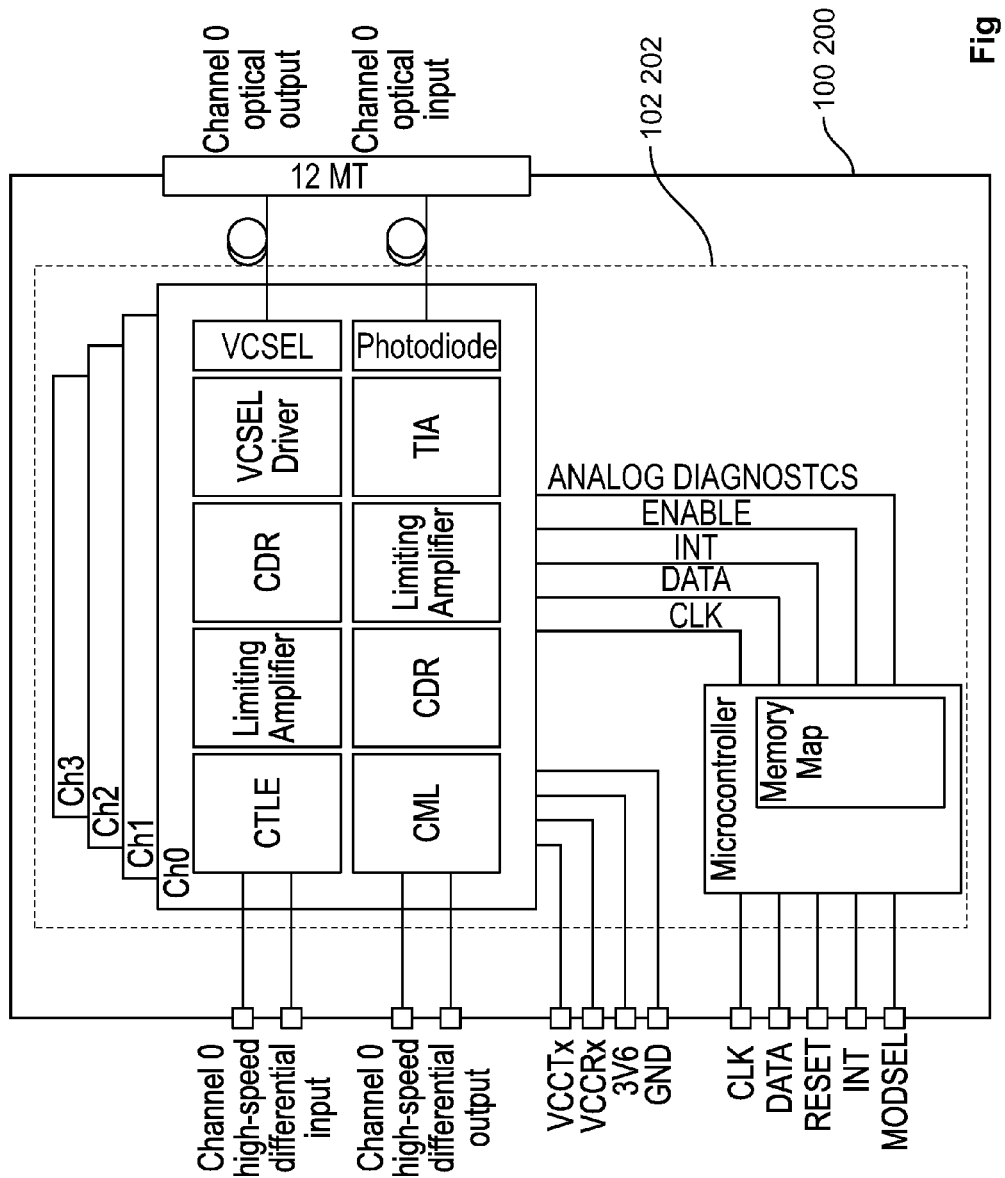
FIG. 3 is a block diagram of the functional architecture of the optoelectronic module shown in FIG. 1.

The invention is explained in greater detail below with reference to embodiments of an optoelectronic module. This invention may, however, be embodied in many different forms and should not be construed as limited to the embodiments set forth herein; rather, these embodiments are provided so that this disclosure will be thorough and complete and still fully convey the scope of the invention to those skilled in the art.

An optoelectronic module 100 according to the invention is shown generally in FIG. 4. The optoelectronic module 100 includes an opto-electric assembly 102, an optical connector 104, a contact 110, a casing 115, and a heat sink 118. The major components of the invention will now be described in greater detail.

The opto-electric assembly 102, as shown in FIGS. 4 and 5, comprises a transparent substrate 128, and is mounted on a carrier 112. The substrate 128 may for instance be fabricated from glass. The carrier 112, which may be a printed circuit board, has an opening 126, at which the substrate 128 is attached. Electrical connections of the substrate 128 are soldered to corresponding contact pads on the carrier 112.

Optical components 130 and integrated circuits (IC) 132 are arranged on one side of the glass substrate 128, whereas an optical chip connector 108 comprising a lens arrangement is positioned on the opposite surface, as shown in FIG. 5. The optical components 130 may comprise an optical transducer converting optical signals into electrical signals and electrical signals into optical signals. Due to the transparency of the glass substrate 128, radiation can be emitted and received through the substrate 128, allowing the optical chip connector 108 to be positioned on a surface of the substrate 128 opposite to the one carrying the optical components 130 and integrated circuits 132.

The optical components 130 and ICs 132 are electrically connected by solder bump flip-chip to the transparent glass carrier 128. However, it is clear for a person skilled in the art that any other suitable assembly technique may also be employed. The backsides of the optical components 130 and ICs 132 are thermally connected by an aluminum stud which forms a thermal bridge 120, shown in FIG. 5. For protecting the optical components 130 and the ICs 132, and for mechanically attaching the thermal bridge 120 to the carrier 112, a thermally conductive casting compound 124 is applied.

The optical connector 104 shown in FIG. 4 may be any form of optical connector known to those with ordinary skill in the art. The optical connector 104 is connected at one end to flexible optical fibers 106, and an opposite end is formed to accept a mating optical connector (not shown) such as an optical ferrule. The optical connector 104 may, for instance, be formed as a standardized mechanical transfer (MT) connector.

The contact 110 shown in FIG. 4 is rigid, and is formed to comply with a desired standard, such as SFF-8661. The contact 110 is connected at one end to flexible cable 111, and an opposite end is formed to mate with a mating electrical connector (not shown). The flexible cable 111 is electrically conductive and may, for instance, be formed from a flat flexible foil cable comprising laminated metal leads. The cable 111 may alternatively be integrally formed with the contact 110, for instance, as the multi-layer circuit board arrangement having a flexible foil combined with a rigid ceramic or polymer circuit board.

The casing 115 is formed by an upper wall 114 and a lower wall 116. In order to provide a shielding as well as effective heat dissipation, the casing 115 may be fabricated from an electrically conductive material, for instance, metal.

The heat sink 118, shown in FIG. 4, may be any form of heat sink known to those with ordinary skill in the art.

The assembly of the optoelectronic module 100 will now be described.

The rigid contact 110 is connected to the carrier 112 carrying the opto-electric assembly 102 by the flexible cable 111, as shown in FIG. 4. The cable 111 may be attached to the carrier 112 and the contact 110 by any known connection technique, including soldering or anisotropic conductive film bonding. The carrier 112, the flexible cable 111, and the rigid contact 110 may alternatively be fabricated as one integral rigid-flexible circuit board formed as a multilayer structure having rigid and bendable regions.

The opto-electric assembly 102 is connected to the optical connector 104 via the flexible optical fibers 106. Optical chip connector 108 is connected to the optical fibers 106, and the lens arrangement couples the light into the optical fibers 106. The optical signals are transmitted from the opto-electric assembly 102 towards the optical connector 104 via the optical fibers 106.

The casing 115, as shown in FIG. 4, encloses and protects the assembly of the opto-electric assembly 102, optical connector 104, and contact 110. As shown in FIGS. 4 and 5, the thermal bridge 120 is connected to the inner surface of the upper wall 114 by a thermally conductive gap pad or thermally conductive adhesive joint 122. The thermally conductive adhesive joint 122 forms a rigid thermal interface between the thermal bridge 120 and the upper wall 114. The heat sink 118 is disposed on an outer surface of the upper wall 114.

The assembled optoelectronic module 100 converts signals between an optical side and an electronic side using the optical engine (OE) 102. The functional architecture shown in FIG. 3 also pertains to the optoelectronic module 100. However, one skilled in the art would understand that the principles of the present invention can also be used for different architectures of an optoelectronic module 100.

As shown in FIG. 3, the optical components 103 of the opto-electric assembly 102, such as an optical transducer, comprise at least one vertical-cavity surface-emitting laser (VCSEL) for emitting radiation and at least one photodiode for receiving radiation. The VCSEL is driven by a belonging driver under the control of a microcontroller in order to convert electric signals into optical signals. The electrical signals generated by the photodiode are amplified by a transimpedance amplifier (TIA), a limiting amplifier, a clock/data recovery (CDR) and a current-mode logic (CML) serial interface, so that optical signals are converted into electrical signals.

In the assembled optoelectronic module 100, the flexible cable 111 and the flexible optical fibers 106 allow for a far-reaching flexibility regarding the position of the carrier 112 in all three dimensions. Any resiliency that is needed for compensating tolerances between the position of the rigid contact 110 and the opto-electric assembly 102 is provided by the flexible cable 111. Consequently, the mechanical connection between the carrier 112 and the casing 115 does not necessarily have to be resilient.

Due to the flexible cable 111 and the flexible optical fibers 106, the carrier 112 can be arranged close to the upper wall 114 of the casing 115. Thereby, the thermal bridge 120 can be mechanically fixed to the casing 115 without adding mechanical strength to the assembly. Moreover, the thermal bridge 120 is attached to the inner surface of the upper wall 114, which is in contact with the heat sink 118. Heat which is generated by the optical components 130 and the ICs 132 can be dissipated to the external heat sink 118 via the upper wall 114 of the module metal casing 115.

Figure 6:
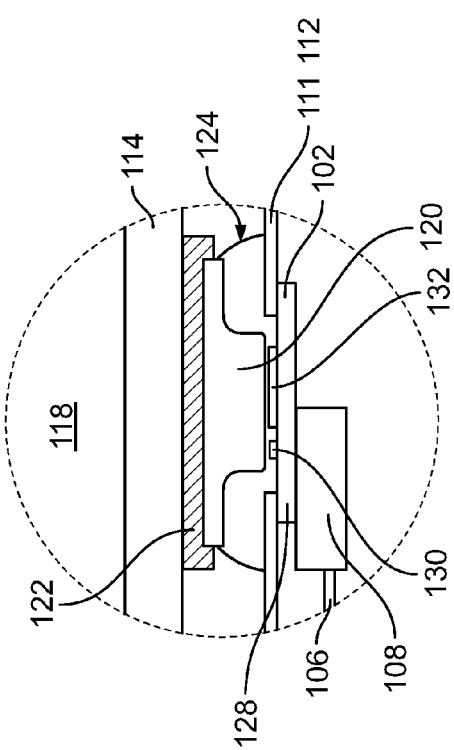
FIG. 6 is a detailed view of a portion of an optoelectronic module according to another embodiment of the invention.

A further embodiment of the optoelectronic module 100 will be explained with reference to FIG. 6. While the carrier 112 according to the first embodiment shown in FIGS. 4 and 5 is formed by a separate printed circuit board, according to this embodiment, the carrier 112 is a flexible foil integrally formed with the flexible cable 111. The advantage of this construction can be seen in the fact that less fabrication steps and fewer separate parts are involved in the fabrication, and that the total height of the assembly can be reduced. In order to provide sufficient stability, a higher amount of the sealing casting compound 124 can be applied between the carrier 112 and the thermal bridge 120 compared to the first embodiment. Alternatively, a thinner thermal bridge 120 can be used.

Figure 7:
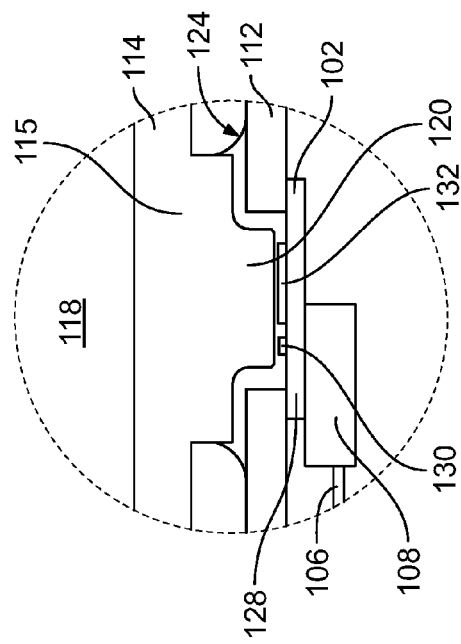
FIG. 7 is a detailed view of a portion of an optoelectronic module according to another embodiment of the invention.

A further variation of the optoelectronic module 100 is depicted in FIG. 7, in which the thermal bridge 120 is an integral part of the casing 115. The thermal bridge 120 is formed as a part of the upper wall 114 which on its outer surface is in direct contact with the heat sink 118. This arrangement has the advantage that no additional layer 122 is present between the thermal bridge 120 and the casing 115, so that the overall thermal resistance is further reduced. Moreover, less separate parts are needed for the assembly. Using such an arrangement is possible due to the flexible cable 111 and the flexible optical fibers 106. Although in FIG. 7 the carrier 112 is depicted as a printed circuit board according to the first embodiment, the embodiment of FIG. 6 in which the carrier 112 is an integral part of the flexible cable 111 can also be combined with a thermal bridge 120 integrated into the casing 115.

FIG. 8 shows a schematic cross-sectional view of an optoelectronic module 100 according to a further embodiment of the present invention. According to this embodiment, the carrier 112 has a larger size in order to facilitate the attachment of the flexible cable 111. The electrical connection may for instance be accomplished by soldering or anisotropic conductive film bonding. Furthermore, the carrier 112 may also comprise shielding and ground layers in a region close to the rigid contact 110.

What is claimed is:

1. An optoelectronic module, comprising:
an optical connector;
a contact;
an opto-electric assembly having a carrier optically connected to the optical connector by a flexible optical fiber and electrically connected to the contact by a flexible cable; and
a casing at least partially enclosing the opto-electric assembly, the optical connector, and the contact, an inner surface of a wall of the casing thermally connected to the carrier by a thermal bridge, the thermal bridge attached to the casing by a rigid thermal interface joint.

2. The optoelectronic module of claim 1, wherein the opto-electric assembly has an optical transducer converting optical signals into electrical signals and electrical signals into optical signals.

3. The optoelectronic module of claim 2, wherein the optical connector is optically connected to a mating optical ferrule.

4. The optoelectronic module of claim 3, wherein the contact is electrically connected to a mating electrical connector.

5. The optoelectronic module of claim 1, wherein the thermal bridge is attached to the carrier by a thermally conductive casting compound.

6. The optoelectronic module of claim 5, wherein the thermally conductive casting compound covers and seals the optical transducer.

7. The optoelectronic module of claim 1, wherein an outer surface of the wall is thermally connected to a heat sink.

8. The optoelectronic module of claim 1, wherein the flexible cable is integrally formed with the carrier.

9. The optoelectronic module of claim 8, wherein the carrier is a flexible foil.

10. The optoelectronic module of claim 1, wherein the flexible cable is integrally formed with the contact.

11. The optoelectronic module of claim 2, wherein the optical transducer has at least one vertical-cavity surface-emitting laser, at least one photodiode, and at least one microcontroller.

12. The optoelectronic module of claim 2, wherein the optical transducer is mounted on a transparent substrate.

13. The optoelectronic module of claim 12, wherein the substrate is mounted at an opening of the carrier such that a first surface of the substrate on which the optical transducer is mounted faces toward the wall.

14. The optoelectronic module of claim 13, wherein an opposite second surface of the substrate is connected to the flexible optical fiber by a lens.

15. The optoelectronic module of claim 1, wherein the flexible cable is attached to the carrier by soldering or anisotropic conductive film bonding.

16. The optoelectronic module of claim 15, wherein the flexible cable is attached to the contact by soldering or anisotropic conductive film bonding.

17. The optoelectronic module of claim 1, wherein the casing is formed by two shells joined along a longitudinal axis of the optoelectronic module.

18. An optoelectronic module, comprising:
an optical connector;
a contact;
an opto-electric assembly having
a transparent substrate,
a carrier mounted on the transparent substrate, optically connected to the optical connector by a flexible optical fiber, and electrically connected to the contact by a flexible cable, and
an optical transducer mounted on the transparent substrate and converting optical signals into electrical signals and electrical signals into optical signals; and
a casing at least partially enclosing the opto-electric assembly, the optical connector, and the contact, an inner surface of a wall of the casing attached to the carrier in a thermally conductive manner, the transparent substrate mounted at an opening of the carrier such that a first surface of the transparent substrate on which the optical transducer is mounted faces toward the wall.

19. The optoelectronic module of claim 18, wherein an opposite second surface of the transparent substrate is connected to the flexible optical fiber by a lens.

20. The optoelectronic module of claim 18, wherein the carrier is thermally connected to the inner surface of the wall by a thermal bridge.

21. The optoelectronic module of claim 20, wherein the thermal bridge is integrally formed with the casing.

22. The optoelectronic module of claim 20, wherein the thermal bridge is attached to the carrier by a thermally conductive casting compound.

23. The optoelectronic module of claim 22, wherein the thermally conductive casting compound covers and seals the optical transducer.

24. The optoelectronic module of claim 18, wherein an outer surface of the wall is thermally connected to a heat sink.

\* \* \* \* \*